United States Patent
Jha et al.

(10) Patent No.: US 11,736,056 B2
(45) Date of Patent: Aug. 22, 2023

(54) SYSTEM AND METHOD FOR CONTROLLING HARMONICS IN A RENEWABLE ENERGY POWER SYSTEM

(71) Applicant: General Electric Company, Schenectady, NY (US)

(72) Inventors: Kapil Jha, Bangalore (IN); Yashomani Yashodhan Kolhatkar, Bangalore (IN); Arvind Kumar Tiwari, Bangalore (IN); Harold R. Schnetzka, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 34 days.

(21) Appl. No.: 16/426,106

(22) Filed: May 30, 2019

(65) Prior Publication Data
US 2020/0382046 A1    Dec. 3, 2020

(51) Int. Cl.
| | |
|---|---|
| H02P 29/50 | (2016.01) |
| F03D 9/25 | (2016.01) |
| H02P 9/00 | (2006.01) |
| H02P 101/15 | (2016.01) |

(52) U.S. Cl.
CPC .............. *H02P 29/50* (2016.02); *F03D 9/255* (2017.02); *H02P 9/007* (2013.01); *H02P 2101/15* (2015.01); *H02P 2207/073* (2013.01)

(58) Field of Classification Search
CPC ............. H02P 9/007; H02P 9/50; F03D 9/255
See application file for complete search history.

(56) References Cited

U.S. PATENT DOCUMENTS

| | | |
|---|---|---|
| 3,593,106 A | 7/1971 | Lafuze |
| 4,281,371 A | 7/1981 | Baker |
| 5,047,910 A | 9/1991 | Levran et al. |
| 7,175,389 B2 | 2/2007 | Moroz |
| 7,187,566 B2 | 3/2007 | Kawashima et al. |
| 7,212,421 B2 | 5/2007 | Chandra et al. |
| 7,281,891 B2 | 10/2007 | Smith et al. |
| 7,342,323 B2 | 3/2008 | Avagliano et al. |
| 7,346,462 B2 | 3/2008 | Delmerico |
| 7,505,833 B2 | 3/2009 | Delmerico et al. |

(Continued)

FOREIGN PATENT DOCUMENTS

| | | |
|---|---|---|
| EP | 1276219 A1 | 1/2003 |
| EP | 2302206 A | 3/2011 |

(Continued)

OTHER PUBLICATIONS

U.S. Appl. No. 15/944,828, filed Apr. 4, 2018.

(Continued)

*Primary Examiner* — Sean Gugger
(74) *Attorney, Agent, or Firm* — Dority & Manning, P.A.

(57) ABSTRACT

A method for operating a power system connected to a power grid includes providing an active filter in the converter power path. Further, the method includes determining a change in attenuation of harmonics of the power system over a predetermined frequency spectrum that is needed to comply with one or more grid code requirements of the power grid. Thus, the method includes actively controlling, via a controller, the active filter to provide the change to the attenuation of the harmonics of the power system so as to mitigate the harmonics of the power system.

11 Claims, 6 Drawing Sheets

(56) References Cited

U.S. PATENT DOCUMENTS

| | | | |
|---|---|---|---|
| 7,521,907 B2 | 4/2009 | Cervera et al. | |
| 7,613,548 B2 | 11/2009 | Cardinal et al. | |
| 7,822,560 B2 | 10/2010 | LeMieux | |
| 7,861,583 B2 | 1/2011 | Honhoff et al. | |
| 7,942,629 B2 | 5/2011 | Shi et al. | |
| 7,979,167 B2 | 7/2011 | Delmerico et al. | |
| 8,013,580 B2 | 9/2011 | Cervera et al. | |
| 8,025,476 B2 | 9/2011 | Zheng et al. | |
| 8,050,887 B2 | 11/2011 | Ahmann | |
| 8,257,040 B2 | 9/2012 | Chen et al. | |
| 8,736,241 B2 | 5/2014 | Cervera et al. | |
| 9,217,416 B2 | 12/2015 | Spruce et al. | |
| 9,605,558 B2 | 3/2017 | Perley et al. | |
| 2005/0035815 A1* | 2/2005 | Cheng | H02M 1/15 327/552 |
| 2007/0075546 A1 | 4/2007 | Avagliano et al. | |
| 2008/0086281 A1 | 4/2008 | Santos | |
| 2008/0088131 A1* | 4/2008 | Thisted | F03D 9/255 290/44 |
| 2009/0047116 A1 | 2/2009 | Barbu et al. | |
| 2011/0057517 A1* | 3/2011 | Zhang | H02J 3/01 307/105 |
| 2011/0074365 A1* | 3/2011 | Nakayama | H02P 9/007 322/27 |
| 2011/0140431 A1 | 6/2011 | Landa et al. | |
| 2012/0128488 A1 | 5/2012 | Kristoffersen | |
| 2012/0263601 A1 | 10/2012 | Baker et al. | |
| 2013/0033040 A1 | 2/2013 | Bowyer et al. | |
| 2013/0156577 A1 | 6/2013 | Esbensen et al. | |
| 2013/0204447 A1 | 8/2013 | Bjerge et al. | |
| 2013/0286692 A1 | 10/2013 | Patel et al. | |
| 2013/0289911 A1 | 10/2013 | Patel et al. | |
| 2013/0297085 A1 | 11/2013 | Xiongzhe et al. | |
| 2014/0035285 A1 | 2/2014 | Creaby et al. | |
| 2014/0037447 A1 | 2/2014 | Attia | |
| 2014/0247021 A1* | 9/2014 | Wagoner | H02J 3/381 322/47 |
| 2014/0253058 A1 | 9/2014 | Cervera et al. | |
| 2014/0319838 A1* | 10/2014 | Wagoner | H02J 3/381 290/44 |
| 2014/0320056 A1 | 10/2014 | Royak et al. | |
| 2015/0073610 A1 | 3/2015 | Schnetzka et al. | |
| 2018/0320660 A1 | 11/2018 | Herr et al. | |
| 2019/0140569 A1* | 5/2019 | Schnetzka | H02M 7/797 |

FOREIGN PATENT DOCUMENTS

| | | |
|---|---|---|
| EP | 3484007 A1 | 5/2019 |
| WO | WO2009/138808 A1 | 11/2009 |
| WO | WO2013/083130 A1 | 6/2013 |
| WO | WO2016/078669 A1 | 5/2016 |
| WO | WO 2019/195503 A1 | 10/2019 |

OTHER PUBLICATIONS

Vinod S Tejwani et al., Power Electronic Converter for Wind Power Plant, 2012 International Conference on Computing, Electronics and Electrical Technologies (ICCEET), Mar. 21, 2012, pp. 413-423.

International Search Report, dated Sep. 25, 2020, for PCT Application No. PCT/US2020/038034.

* cited by examiner

SYSTEM AND METHOD FOR CONTROLLING HARMONICS IN A RENEWABLE ENERGY POWER SYSTEM

FIELD

The present disclosure relates generally to renewable energy farms, such as wind farm, and more particular to a system and method for controlling harmonics in a renewable energy power system.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

During operation, wind impacts the rotor blades of the wind turbine and the blades transform wind energy into a mechanical rotational torque that rotatably drives a low-speed shaft. The low-speed shaft is configured to drive the gearbox that subsequently steps up the low rotational speed of the low-speed shaft to drive a high-speed shaft at an increased rotational speed. The high-speed shaft is generally rotatably coupled to a generator so as to rotatably drive a generator rotor. As such, a rotating magnetic field may be induced by the generator rotor and a voltage may be induced within a generator stator that is magnetically coupled to the generator rotor. In certain configurations, the associated electrical power can be transmitted to a turbine transformer that is typically connected to a power grid via a grid breaker. Thus, the turbine transformer steps up the voltage amplitude of the electrical power such that the transformed electrical power may be further transmitted to the power grid.

In many wind turbines, the generator rotor may be electrically coupled to a bi-directional power converter that includes a rotor side converter joined to a line side converter via a regulated DC link. More specifically, some wind turbines, such as wind-driven doubly-fed induction generator (DFIG) systems or full power conversion systems, may include a power converter with an AC-DC-AC topology. In such system, the generator stator is separately connected to the power grid via a main transformer.

In certain instances, however, such systems can generate turbine harmonics that need to be controlled and/or reduced as one of the requirements from various grid codes is compliance of current and voltage harmonics at the output of the wind turbine. The primary sources of harmonics in DFIG-based wind turbine systems are the rotor-side and the line-side converters. The harmonics in the rotor-side converter primarily contribute in turbine harmonics via the stator current. Stator and line currents become combined together to generate turbine harmonics (with or without the main transformer).

Thus, in a DFIG system, where the stator is isolated from the power converter, a passive filter is generally provided between the stator and the grid to allow the stator voltage to be different from the converter voltage. Though such filters can reduce harmonics supplied from the DFIG to the power grid, they do not provide much flexibility with varying operating conditions.

Thus, the present disclosure is directed to systems and methods for controlling harmonics in a renewable energy power system.

BRIEF DESCRIPTION

Aspects and advantages of the invention will be set forth in part in the following description, or may be obvious from the description, or may be learned through practice of the invention.

In one aspect, the present disclosure is directed to a method for operating a power system connected to a power grid. The power system defines a generator power path and a converter power path. The generator power path has a generator, such as a doubly fed induction generator (DFIG), with a rotor and a stator. The converter power path has a power converter with a rotor-side converter and a line-side converter. The method includes providing an active filter in the converter power path. Further, the method includes determining a change in attenuation of harmonics of the power system over a predetermined frequency spectrum that is needed to comply with one or more grid code requirements of the power grid. Thus, the method includes actively controlling, via a controller, the active filter to provide the change to the attenuation of the harmonics of the power system so as to mitigate the harmonics of the power system.

In one embodiment, the method may include receiving one or more operating conditions of the power system and determining the change in attenuation of the harmonics in the power system over the predetermined frequency spectrum based on the one or more operating conditions. In another embodiment, the operating condition(s) may include voltage, current, temperature, power output, and/or frequency.

In further embodiments, the method may include providing the active filter between the line-side converter and the power grid so as to mitigate the harmonics of a turbine output of the power system. In another embodiment, the method may include providing a passive filter between the active filter and the line-side converter so as to mitigate the harmonics of the turbine output of the power system.

In certain embodiments, the active filter may be an active power filter. Thus, in one embodiment, actively controlling the active filter to provide the change to the attenuation of the harmonics of the power system may include tuning the active power filter to at least one of a plurality of frequencies simultaneously or consecutively. More specifically, in certain embodiments, tuning the active power filter to the plurality of frequencies simultaneously or consecutively may include tuning the active power filter to compensate for harmonics in line current and stator current simultaneously.

In additional embodiments, the method may include generating reactive power via the active filter and/or reducing resonance damping of the power system via the active filter.

In several embodiments, the power system maybe absent of a stator distortion filter between the stator and the power grid and a line-side distortion filter.

In another aspect, the present disclosure is directed to a doubly fed induction generator (DFIG) power system connected to a power grid. The DFIG power system includes a generator power path having a DFIG with a rotor and a stator and a converter power path having a power converter. The power converter includes a rotor-side converter and a line-side converter. The converter power path includes an active filter. The DFIG power system also includes a controller for controlling the DFIG power systems. The controller is configured to perform a plurality of operations, including but not limited to determining a change in attenuation of harmonics of the power system over a predetermined frequency spectrum that is needed to comply with one or more grid code requirements of the power grid, and actively controlling the active filter to provide the change to the attenuation of the harmonics of the power system so as to mitigate the harmonics of the power system.

In yet another aspect, the present disclosure is directed a wind turbine connectable to a power grid. The wind turbine includes a tower, a nacelle mounted atop the tower, a rotor having a rotatable hub with one or more rotor blades mounted thereto, and a doubly fed induction generator (DFIG) power system. The DFIG power system includes a generator power path having a DFIG having a generator rotor and a generator stator and a converter power path having a power converter with a rotor-side converter and a line-side converter. The converter power path further includes an active power filter. The DFIG power system also includes a controller for controlling the DFIG power system. The controller is configured to perform a plurality of operations, including but not limited to determining a change in attenuation of harmonics of the power system over a predetermined frequency spectrum that is needed to comply with one or more grid code requirements of the power grid, and actively controlling the active power filter to provide the change to the attenuation of the harmonics of the power system so as to mitigate the harmonics of the power system.

It should also be understood that the power system and/or the wind turbine may further include any of the additional features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The primary sources of harmonics in DFIG-based power systems are typically the rotor-side converter and the line-side converter. The harmonics in the rotor-side converter primarily contribute in turbine harmonics via stator current. Stator and line currents become combined together to generate turbine harmonics (with or without a transformer). One of the requirements from various grid codes is compliance of current and voltage harmonics at the output of the wind turbine. As such, for conventional systems, passive filters are usually used to achieve grid compliance. As passive filters are usually tuned for a single frequency or a few discrete frequencies, conventional passive filters are inherently inflexible.

As such, the present disclosure is directed to systems and methods that include active harmonic filters that can be programmed to change the attenuation of harmonics over the frequency spectrum, in order to comply the grid codes. This requirement of change in the attenuation may arise because of different grid requirements and/or operating conditions. As such, the active harmonic filters of the present disclosure are able to be tuned to filter different and multiple frequencies at the same time.

An advantage of having the active harmonic filters of the present disclosure at the line-side converter terminal is that the point of coupling voltage and frequency are decided by the grid and more-or-less fixed. Also, the active harmonic filters of the present disclosure and the line-side converter can compensate for harmonics present in turbine output directly, and therefore, can compensate for the harmonics present in line current and stator current simultaneously.

Figure 1:
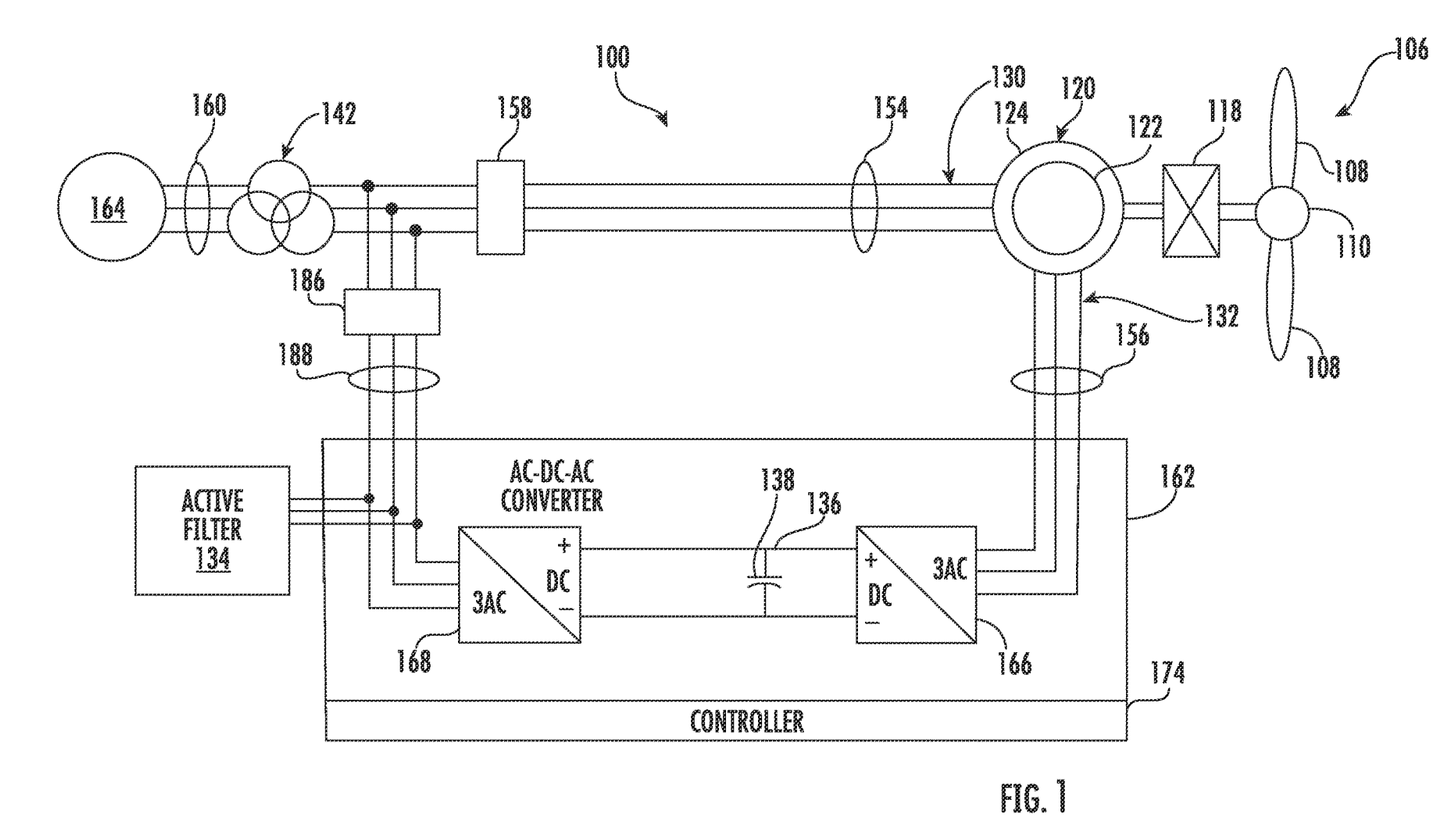
FIG. 1 illustrates one embodiment of an example renewable energy power system according to the present disclosure.

Referring now to the drawings, FIG. 1 illustrates an example wind driven doubly-fed induction generator (DFIG) system 100 according to one embodiment of the present disclosure. Example aspects of the present disclosure are discussed with reference to the DFIG wind turbine 10 of FIG. 1 for purposes of illustration and discussion. Those of ordinary skill in the art, using the disclosures provided herein, should understand that example aspects of the present disclosure are also applicable in other power systems, such as a wind, solar, gas turbine, or other suitable power generation system.

In the example system 100, a rotor 106 includes a plurality of rotor blades 108 coupled to a rotatable hub 110, and together define a propeller. The propeller is coupled to an optional gearbox 118, which is, in turn, coupled to a generator 120 having a rotor 122 and a stator 124. In accordance with aspects of the present disclosure, the generator 120 may be any suitable generator, including for example, a doubly fed induction generator (DFIG). The generator 120 is typically coupled to a stator bus 154 and a power converter 162 via a rotor bus 156. The stator bus 154 provides an output multiphase power (e.g. three-phase power) from a stator of the generator 120 and the rotor bus 156 provides an output multiphase power (e.g. three-phase power) of a rotor of the generator 120.

The power converter 162 includes a rotor-side converter 166 coupled to a line-side converter 168. The DFIG 120 is coupled to the rotor-side converter 166 via the rotor bus 156. The line-side converter 168 is coupled to a line-side bus 188. Further, as shown, the stator bus 154 may be directly connected to the line-side bus 188. In example configurations, the rotor-side converter 166 and the line-side converter 168 are configured for normal operating mode in a three-phase, PWM arrangement using insulated gate bipolar transistor (IGBT) switching elements, which are discussed in more detail herein. The rotor-side converter 166 and the line-side converter 168 can be coupled via a DC link 136 across which is the DC link capacitor 138. In alternative embodiments, the stator bus 154 and the power converter 162 may be connected to separate isolated windings of a transformer (not shown), i.e. at the junction of the generator breaker 158 and the converter breaker 186.

The power converter 162 can be coupled to a controller 174 to control the operation of the rotor-side converter 166 and the line-side converter 168 and other aspects of the power system 100. For example, as shown particularly in FIG. 2, the controller 174 can include any number of control devices. In one implementation, for example, the controller 174 can include one or more processor(s) 176 and associated memory device(s) 178 configured to perform a variety of computer-implemented functions and/or instructions (e.g., performing the methods, steps, calculations and the like and storing relevant data as disclosed herein). The instructions when executed by the processor 176 can cause the processor 176 to perform operations, including providing control commands (e.g. pulse width modulation commands) to the switching elements of the power converter 162 and other aspects of the power system 100.

Figure 2:
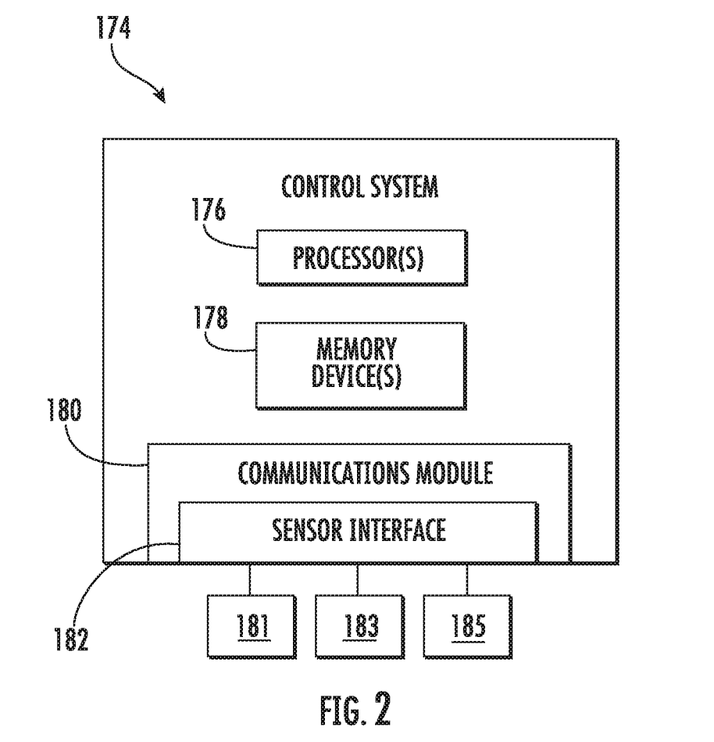
FIG. 2 illustrates a block diagram of one embodiment of a controller suitable for use with the renewable energy power system shown in FIG. 1.

Additionally, the controller 174 may also include a communications module 180 to facilitate communications between the controller 174 and the various components of the power system 100, e.g. any of the components of FIG. 1. Further, the communications module 180 may include a sensor interface 182 (e.g., one or more analog-to-digital converters) to permit signals transmitted from one or more sensors to be converted into signals that can be understood and processed by the processors 176. It should be appreciated that the sensors (e.g. sensors 181, 183, 185) may be communicatively coupled to the communications module 180 using any suitable means. For example, as shown in FIG. 2, the sensors 181, 183, 185 are coupled to the sensor interface 182 via a wired connection. However, in other embodiments, the sensors 181, 183, 185 may be coupled to the sensor interface 182 via a wireless connection, such as by using any suitable wireless communications protocol known in the art. As such, the processor 176 may be configured to receive one or more signals from the sensors.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 176 is also configured to compute advanced control algorithms and communicate to a variety of Ethernet or serial-based protocols (Modbus, OPC, CAN, etc.). Additionally, the memory device(s) 178 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 178 may generally be configured to store suitable computer-readable instructions that, when implemented by the processor(s) 176, configure the controller 174 to perform the various functions as described herein.

In operation, alternating current power generated at the DFIG 120 by rotation of the rotor 106 is provided via a dual path to a grid bus 160 and ultimately to an electrical grid 164. The dual paths are defined by a generator power path 130 and a converter power path 132. On the converter power path 132, sinusoidal multi-phase (e.g. three-phase) alternating current (AC) power is provided to the power converter 162 via the rotor bus 156.

The rotor-side power converter 166 converts the AC power provided from the rotor bus 156 into direct current (DC) power and provides the DC power to the DC link 136. Switching elements (e.g. IGBTs) used in bridge circuits of the rotor side power converter 166 can be modulated to convert the AC power provided from the rotor bus 156 into DC power suitable for the DC link 136.

The line-side converter 168 converts the DC power on the DC link 136 into AC output power suitable for the electrical grid 160. In particular, switching elements (e.g. IGBTs) used in bridge circuits of the line-side power converter 168 can be modulated to convert the DC power on the DC link 136 into AC power on the line-side bus 188. The AC power from the power converter 162 can be combined with the power from the stator of the DFIG 120 to provide multi-phase power (e.g. three-phase power) having a frequency maintained substantially at the frequency of the electrical grid 160 (e.g. 50 Hz/60 Hz). Further, as shown, the associated electrical power can be transmitted to a main transformer 142 that is typically connected to the electrical grid 160. Thus, the main transformer 142 steps up the voltage amplitude of the electrical power such that the transformed electrical power may be further transmitted to the power grid 160.

Various circuit breakers and switches, such as a generator breaker 158 and converter breaker 186, can be included in the system 100 to connect or disconnect corresponding buses, for example, when current flow is excessive and can damage components of the wind turbine system 100 or for other operational considerations. Additional protection components can also be included in the wind turbine system 100.

The power converter 162 can receive control signals from, for instance, the controller 174. The control signals can be based, among other things, on sensed conditions or operating characteristics of the wind turbine system 100. Typically, the control signals provide for control of the operation of the power converter 162. For example, feedback in the form of sensed speed of the DFIG 120 can be used to control the conversion of the output power from the rotor bus 156 to maintain a proper and balanced multi-phase (e.g. three-phase) power supply. Other feedback from other sensors can also be used by the controller 174 to control the power converter 162, including, for example, stator and rotor bus voltages and current feedbacks. Using the various forms of feedback information, switching control signals (e.g. gate timing commands for IGBTs), stator synchronizing control signals, and circuit breaker signals can be generated.

Figure 3:
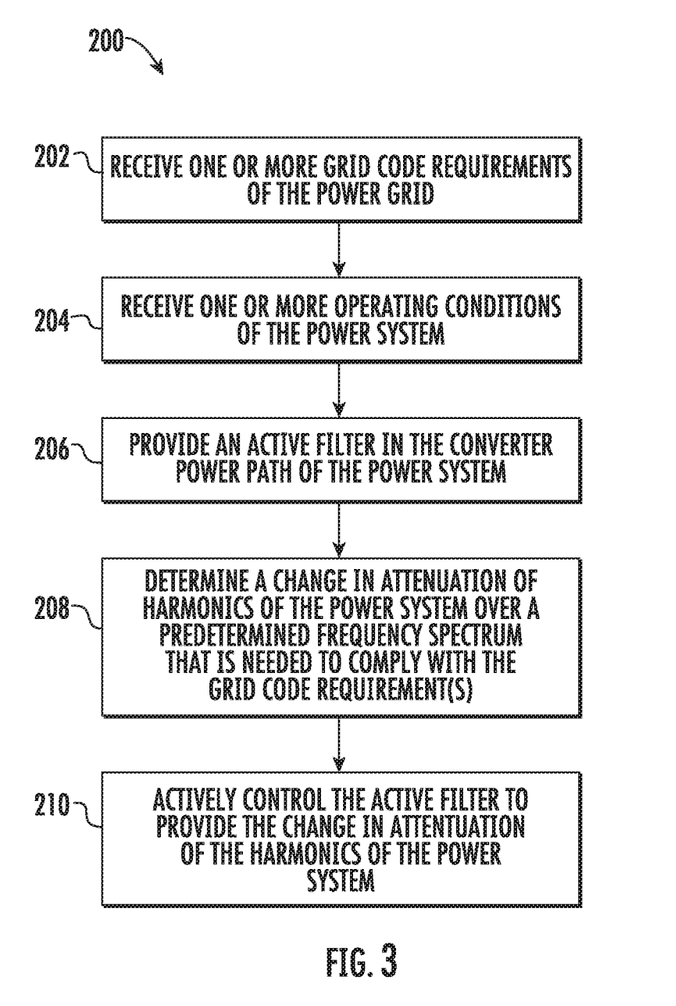
FIG. 3 illustrates a flow diagram of another embodiment of a method for operating a DFIG power system connected to a power grid according to the present disclosure.

Referring now to FIG. 3, a flow diagram of one embodiment of a method 200 for operating a power system connected to a power grid according to the present disclosure is illustrated. In general, the method 200 described herein generally applies to operating the DFIG wind turbine power system 100 described above. However, it should be appreciated that the disclosed method 200 may be implemented using any other suitable power system that is configured to supply power, including reactive power, for application to a load, such as a power grid. Further, FIG. 3 depicts steps performed in a particular order for purposes of illustration and discussion. Those of ordinary skill in the art, using the disclosures provided herein, will understand that various steps of any of the methods disclosed herein can be adapted, omitted, rearranged, or expanded in various ways without deviating from the scope of the present disclosure.

As shown at (202), the method 200 may optionally include receiving one or more grid code requirements of the power grid. For example, in an embodiment, the grid code requirements may vary from country to country and therefore may have varying requirements for harmonics, voltage, current, ride through capabilities, reactive power, active power, etc. In addition, as shown at (204), the method 200 may also include receiving one or more operating conditions of the power system. For example, the operating condition(s) may include voltage, current, temperature, power output, and/or frequency.

Figure 4:
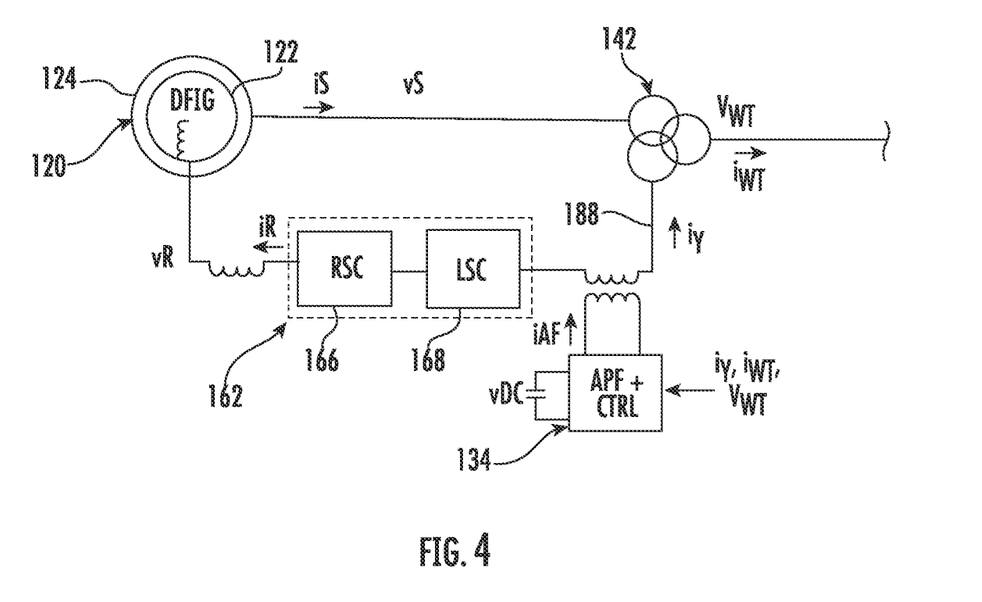
FIG. 4 illustrates a simplified schematic diagram of one embodiment of a DFIG power system having an active power filter according to the present disclosure.

Thus, as shown at (206), the method 200 includes providing an active filter 134 in the converter power path 132. More specifically, as shown in FIGS. 1 and 4-7, the active filter 134 may be provided between the line-side converter 168 and the power grid 160 (e.g. before the main transformer 142) so as to mitigate the harmonics of a turbine output of the power system 100. For example, in certain embodiments, as shown in FIG. 4, the active filter 134 may be an active power filter, e.g. connected to line-side converter terminals/the line-side bus 188. As described herein, active power filters are filters, which can reduce and/or eliminate harmonics by filtering out harmonics in the power system 100 that are significantly below a switching frequency of the filter. As such, active power filters can be used to filter out both higher and lower order harmonics in the power system 100.

Figure 7:
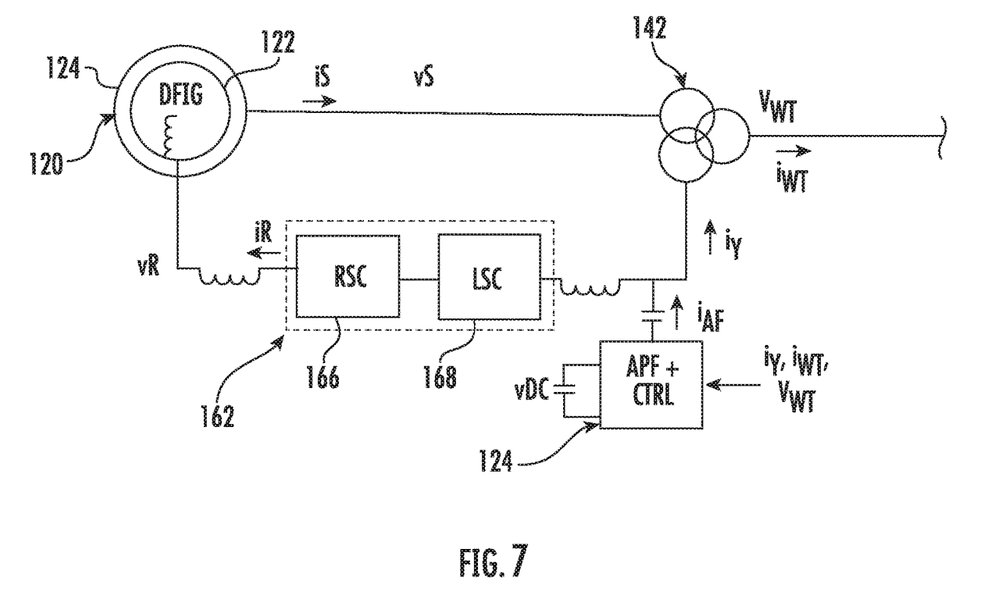
FIG. 7 illustrates a simplified schematic diagram of another embodiment of a DFIG power system having an active power filter according to the present disclosure.

However, in alternative embodiments, as shown in FIG. 7, the active filter 134 may be a shunt active filter connected to the line-side bus 188 that senses the load current and injects a current into the power system 100 to compensate or change the harmonics or reactive load. In one embodiment, the shunt active filter may also be a part of the hybrid filter architecture described herein. In such embodiments, the line-side converter impedance may be comparable with the grid-side impedance under certain conditions.

Figure 5:
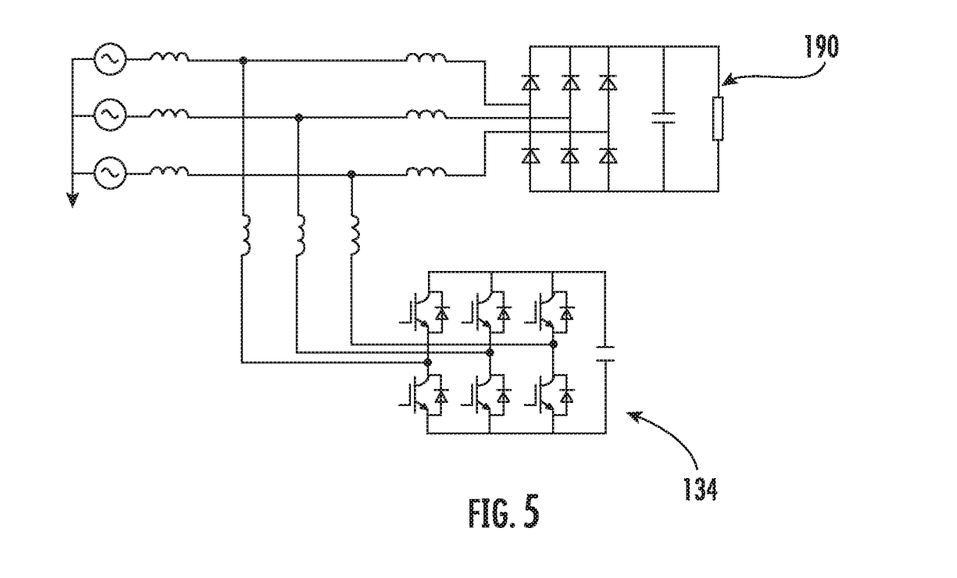
FIG. 5 illustrates a partial schematic diagram of one embodiment of a purely active power filter architecture according to the present disclosure.
Figure 6:
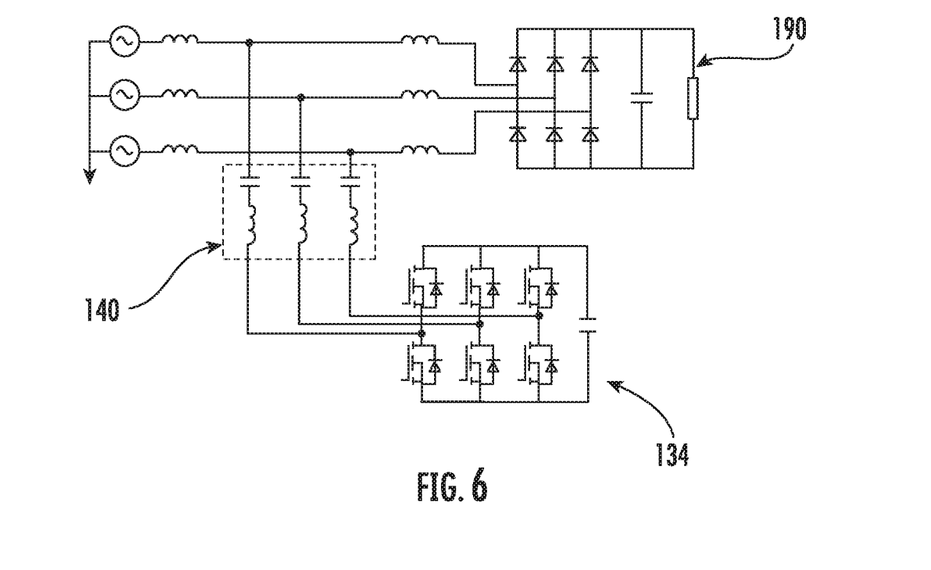
FIG. 6 illustrates a partial schematic diagram of one embodiment of a hybrid filter architecture according to the present disclosure.

Referring particularly to FIG. 5, the filter architecture may include a purely active power filter architecture. In such embodiments, the purely active power filter architecture may include only an active filter 134 having a larger size than, for example, the hybrid filter architecture described herein (FIG. 6). In addition, the purely active filter 134 may have a higher DC voltage requirement than, for example, the hybrid filter architecture described herein. In an embodiment, the rotor-side impedance may be smaller than for conventional systems. In addition, the active power filter 134 can help to reduce the size of and/or eliminate the requirement of stator/line distortion filters of conventional systems.

Referring particularly to FIG. 6, the filter architecture may include a hybrid active power filter architecture having both active and passive filters 134, 140. More specifically, as shown, the hybrid active power filter architecture includes the active power filter 134 with a passive filter 140 between the active filter 134 and a diode rectifier 190 (which is a harmonic producing load) so as to mitigate the harmonics of the turbine output of the power system 100. In an embodiment, the hybrid active power filter architecture may have better attenuation of resonant frequency, for example, than using the active filter 134 alone. In addition, the hybrid active power filter architecture can help to reduce the size of and/or eliminate the requirement of stator/line distortion filters of conventional systems.

Referring back to FIG. 3, as shown at (208), the method 200 includes determining a change in attenuation of harmonics of the power system 100 over a predetermined frequency spectrum that is needed to comply with the grid code requirement(s).

As shown at (210), the method 200 includes actively controlling, via the controller 174, the active filter 134 to provide the change to the attenuation of the harmonics of the power system 100 so as to mitigate the harmonics of the power system 100. More specifically, in one embodiment, the controller 174 may be configured to determine the change in attenuation of the harmonics in the power system 100 over the predetermined frequency spectrum based on both the grid requirement(s) and the operating conditions.

Thus, in one embodiment, the controller 174 may actively control the active filter 134 to provide the change to the attenuation of the harmonics of the power system 100 by tuning the active power filter 134 to a plurality of frequencies simultaneously or consecutively. More specifically, in certain embodiments, the controller 174 may tune the active power filter 134 to the plurality of frequencies simultaneously or consecutively by tuning the active power filter to compensate for harmonics in line current and stator current simultaneously.

In additional embodiments, the method 200 may include generating reactive power via the active filter 134 and/or reducing resonance damping of the power system via the active filter 134.

Exemplary embodiments of a wind turbine, a controller for a wind turbine, and methods of controlling a wind turbine are described above in detail. The methods, wind turbine, and controller are not limited to the specific embodiments described herein, but rather, components of the wind turbine and/or the controller and/or steps of the methods may be utilized independently and separately from other components and/or steps described herein. For example, the controller and methods may also be used in combination with other wind turbine power systems and methods, and are not limited to practice with only the power system as described herein. Rather, the exemplary embodiment can be implemented and utilized in connection with many other wind turbine or power system applications, such as solar power systems.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a power system connected to a power grid, the power system defining a generator power path and a converter power path, the generator power path having a doubly fed induction generator (DFIG) with a rotor and a stator, the stator connected to the power grid via a transformer, the converter power path having a power converter with a rotor-side converter and a line-side converter, the method comprising:
   providing an active filter in the converter power path between the line-side converter and the transformer;
   receiving a plurality of operating conditions of the power system, the plurality of operating conditions comprising a line current and a turbine output current;
   determining, based on the line current and the turbine output current, a change in attenuation of harmonics of the power system over a frequency spectrum of multiple frequencies that is needed to comply with one or more grid code harmonic requirements of the power grid, the one or more grid code harmonic requirements referring to compliance of current and voltage harmonics at a turbine output of the power system; and
   actively controlling, via a controller, the active filter to generate reactive power for:
      providing the change to the attenuation of the harmonics of the power system over the frequency spectrum so as to compensate for harmonics in the line current and stator current simultaneously without eliminating the harmonics completely; and
      resonance damping of the power system via the active filter.

2. The method of claim 1, wherein the plurality of operating conditions further comprise at least one of voltage, temperature, power output, or frequency.

3. The method of claim 1, further comprising providing a passive filter between the active filter and the line-side converter so as to mitigate the harmonics of the turbine output of the power system.

4. The method of claim 1, wherein the active filter comprises an active power filter.

5. The method of claim 4, wherein actively controlling the active filter to provide the change to the attenuation of the harmonics of the power system further comprises tuning the active power filter to at least one of a plurality of frequencies simultaneously or consecutively.

6. The method of claim 1, wherein the power system is absent of a stator distortion filter between the stator and the power grid and a line-side distortion filter.

7. A doubly fed induction generator (DFIG) power system connected to a power grid, the DFIG power system comprising:
   a generator power path comprising a DFIG with a rotor and a stator;
   a converter power path comprising a power converter, the power converter comprising a rotor-side converter coupled to a line-side converter, the stator of the DFIG coupled to the power grid via a stator bus, the rotor of the DFIG coupled to the rotor-side converter via a rotor bus, the stator bus coupled to a line-side bus coupled to the line-side converter, the converter power path further comprising an active power filter connected to the line-side bus, the active power filter between the line-side converter and the power grid; and
   a controller for controlling the DFIG power system, the controller configured to perform a plurality of operations, the plurality of operations comprising:
      receiving a plurality of operating conditions of the power system, the plurality of operating conditions comprising a line current and a turbine output current;
      determining, based on the line current and the turbine output current, a change in attenuation of harmonics of the power system over a frequency spectrum of multiple frequencies that is needed to comply with one or more grid code harmonic requirements of the power grid, the one or more grid code harmonic requirements referring to compliance of current and voltage harmonics at a turbine output of the power system; and
      actively controlling, via a controller, the active power filter to generate reactive power for:
         providing the change to the attenuation of the harmonics of the power system over the frequency spectrum so as to compensate for harmonics in line current and stator current simultaneously without eliminating the harmonics completely; and
         resonance damping of the power system via the active power filter.

8. The DFIG power system of claim 7, wherein the plurality of operating conditions further comprise at least one of voltage, temperature, power output, or frequency.

9. The DFIG power system of claim 7, further comprising a passive filter provided between the active power filter and the line-side converter so as to mitigate the harmonics of the turbine output of the power system.

10. The DFIG power system of claim 7, wherein actively controlling the active power filter to provide the change to the attenuation of the harmonics of the power system further comprises tuning the active power filter to at least one of a plurality of frequencies simultaneously or consecutively.

11. A wind turbine connectable to a power grid, comprising:
   a tower;
   a nacelle mounted atop the tower;
   a rotor comprising a rotatable hub with one or more rotor blades mounted thereto; and
   a doubly fed induction generator (DFIG) power system comprising:
      a generator power path comprising a DFIG having a generator rotor and a generator stator;
      a converter power path comprising a power converter, the power converter comprising a rotor-side converter coupled to a line-side converter, the stator of the DFIG coupled to the power grid via a stator bus, the rotor of the DFIG coupled to the rotor-side converter via a rotor bus, the stator bus coupled to a line-side bus coupled to the line-side converter, the converter power path further comprising an active power filter connected to the line-side bus, the active power filter between the line-side converter and the power grid; and
      a controller for controlling the DFIG power system, the controller configured to perform a plurality of operations, the plurality of operations comprising:
         receiving a plurality of operating conditions of the power system, the plurality of operating conditions comprising a line current and a turbine output current;

determining, based on the line current and the turbine output current, a change in attenuation of harmonics of the stator and the line-side converter of the power system over a frequency spectrum of multiple frequencies that is needed to comply with one or more grid code harmonic requirements of the power grid, the one or more grid code harmonic requirements referring to compliance of current and voltage harmonics at a turbine output of the power system; and actively controlling, via a controller, the active power filter to generate reactive power for:
  providing the change to the attenuation of the harmonics of the power system over the frequency spectrum so as to compensate for harmonics in line current and stator current simultaneously without eliminating the harmonics completely; and
  resonance damping of the power system via the active power filter.

* * * * *